United States Patent [19]

Fielding

[11] Patent Number: 5,006,587

[45] Date of Patent: Apr. 9, 1991

[54] POLYPROPYLENE FORMULATIONS CONTAINING SMALL AMOUNTS OF FLUOBORATES TO IMPROVE COLOR AND WATER CARRY-OVER

[75] Inventor: Ivor R. Fielding, Naperville, Ill.

[73] Assignee: Amoco Corporation, Chicago, Ill.

[21] Appl. No.: 412,172

[22] Filed: Sep. 25, 1989

[51] Int. Cl.$^5$ ............................................. C08K 5/3435
[52] U.S. Cl. ...................................... 524/405; 524/100; 524/101; 524/102; 524/103; 524/104
[58] Field of Search ............... 524/409, 405, 100, 101, 524/102, 103, 104

[56] References Cited

U.S. PATENT DOCUMENTS

| | | | |
|---|---|---|---|
| 2,842,510 | 7/1958 | Robertson | 524/405 |
| 3,239,482 | 3/1966 | Rapp | 524/409 |
| 3,287,312 | 11/1966 | Ling | 524/405 |
| 3,376,253 | 4/1968 | Burnthall et al. | 524/405 |
| 3,635,866 | 1/1972 | Seger | 524/144 |
| 3,730,940 | 5/1973 | Versnel et al. | 524/89 |
| 3,730,942 | 5/1973 | Green et al. | 524/89 |
| 3,909,489 | 9/1975 | Callander | 524/405 |

OTHER PUBLICATIONS

V. Ya. Shlyapintokh and V. B. Ivanov, "Antioxidant Action of Sterically Hindered Amines and Related Compounds"—*Developments in Polymer Stabilization-5*, G. Scott, pp. 41-70 (1982).

*Crystalline Olefin Polymers-Part II*, 131-144, 148-151, 464, 465 and 467-R. A. Raff & K. W. Doak, editors (1965).

Xun-Zhuan Yang et al; "Mechanism of . . . Hindered Amines", *Polymer Degradation & Stability* 20 (1988) 1-35.

*Primary Examiner*—Veronica P. Hoke
*Attorney, Agent, or Firm*—Margaret M. Duncan; William H. Magidson; Ralph C. Medhurst

[57] ABSTRACT

A polypropylene composition which demonstrates good color stability and water carry-over properties comprises polypropylene containing a hindered amine light stabilizer and about 0.01 to about 0.5 wt. % of a fluoborate salt. Ammonium fluoborate, sodium fluoborate and potassium fluoborate are particularly useful.

12 Claims, No Drawings

POLYPROPYLENE FORMULATIONS CONTAINING SMALL AMOUNTS OF FLUOBORATES TO IMPROVE COLOR AND WATER CARRY-OVER

BACKGROUND OF THE INVENTION

This invention relates to polypropylene formulations and particularly relates to polypropylene formulations containing hindered amine light stabilizers to which small amounts of fluoborate salts are added for improved color and water carry-over properties.

Extruded polypropylene resins used for films, fibers and molded articles generally contain primary and secondary antioxidants as well as special additives for particular end uses such as pigments, UV stabilizers, thermal stabilizers, peroxides, antistats, fillers, impact modifiers, flame retardants, and the like. Primary antioxidants include, for example, hindered phenols such as 2,6 di-t-butyl-p-cresol, octadecyl-3,5-di-t-butyl-4-hydroxyhydrocinnamate, tetrakis (methylene(3,5-di-t-butyl-4-hydroxyhydrocinnamate)) methane, and tris(3,5-di-t-butyl-4-hydroxybenzyl)isocyanurate. These usually are incorporated in polypropylene resins at concentration levels of about 0.01 to about 0.5 wt.% and typically about 0.04 to about 0.1 wt.%.

Secondary antioxidants include the organic phosphites such as, for example, distearyl pentaerythritol diphosphite, tris(2,4-di-t-butylphenyl)phosphite, tetrakis(2,4,-di-t-butylphenyl)-4,4'-bisphenylene diphosphonite and tris (mixed mono- and dinonylphenyl) phosphite. These act in combination with the primary antioxidant and are sometimes added to the polypropylene resin at about the same range of concentration as the primary antioxidant. The special additives vary broadly depending on the particular type of additive and the end use requirements.

Polypropylene resin compositions also usually include acid scavenger agents or acid neutralizers, such as calcium stearate, zinc stearate, calcium oxide, magnesium/aluminum hydroxycarbonate, dihydroxy talcite and calcium pelargonate, at concentrations generally of about 0.01 to about 0.1 wt.%. The purpose of these agents is to neutralize acid residues derived from the polymerization catalyst which will lower the corrosivity of the resulting polymer composition.

Such resins often additionally include hindered amine light stabilizers such as N-N'-bis(2,2,6,6-tetramethyl-4-piperidinyl)-1,6-hexanediamine, polymer with 2,4,4-tri-chloro-1,3,5-triazine and 2,4,4-trimethyl-1,2-pentanamine sold under the trademark Chimassorb 944FL by Ciba-Geigy, poly((6-morpholino-s-triazine-2,4-diyl)-((2,2,6,6-tetramethyl-4-piperidyl)imino)-hexamethylene ((2,2,6,6- tetramethyl-4-piperidyl)imino)) sold under the trademark Cyasorb UV3346 by American Cyanamid, and bis(2,2,6,6- tetramethyl-4-piperidinyl)sebacate sold under the trademark Tinuvin 770 by Ciba-Geigy. These are added to protect the resin from degradation due to ultraviolet light exposure from sunlight.

Incorporation of fluoborates into polymer compositions has been disclosed generally for fire retardant or mineral filler purposes. U.S. Pat. Nos. 3,730,940 and 3,730,942 disclose flame retardant compositions of polypropylene and polyethylene, respectively, containing 2-10 wt.% halogenated organic flame retardant, 5-10 wt.% ammonium fluoborate or ammonium sulfate, 5-10 wt.% metal synergist and about 15-25 wt.% silica.

U.S. Pat. No 3,635,866 discloses flame retardant polybutene-1 compositions containing 4-8 wt.% ammonium fluoborate, antimony trioxide and another halogenated compound.

U.S. Pat. No. 3,493,535 discloses a polyethylene maleate diester graft copolymer which may contain 5 to 100 parts per 100 parts of polymer of solid inert particulate material, such as ammonium fluoborate, which is rigid and does not react with the molten graft copolymer.

U.S. Pat. No. 3,785,859 discloses treating natural or synthetic fibers with an aziridinyl phosphine oxide containing a halogen and an acid curing catalyst ammonium borofluoride. Polypropylene fibers are not specifically disclosed in this patent.

U.S. Pat. No. 3,287,312 discloses a flame resistant cross-linked polyethylene composition containing 4-20 wt.% inorganic fluoborate such as ammonium fluoborate, sodium fluoborate and potassium fluoborate.

French Patent document 1,448,571 discloses a flame retardant polypropylene composition which may contain 5-75 wt.% preferably 10-50 wt.% fluoborate such as zinc fluoborate tetramine and nickel fluoborate hexamine.

USSR Patent document 1070143A discloses a low-density polyethylene composition containing 30-70 wt.% aluminum or ammonium fluoborate as a mineral filler.

None of the above-described publications describes a polypropylene composition containing a hindered amine to which small amounts of a fluoborate salt are added to act as an acid scavenger and for improvement of color and water carry-over properties.

It is well-known in the art that different additive packages are used depending on the desired properties or use of the resulting polypropylene formulation. Two properties of polypropylene compositions which may be affected by the additive package are color, expressed as the yellowness index, and water carry-over. Yellowness index is the magnitude of yellowness under daylight illumination of homogeneous, nonfluorescent, nearly colorless, transparent or nearly white translucent or opaque plastics relative to magnesium oxide. See ASTM Standards D1925-70 (1977), incorporated herein by reference. Water carry-over is an effect observed in extruding a film from a melt in which the film is cooled in a water bath. As a film moves through the water bath, water may adhere to the polymer and be carried along with the film. Water carry-over is expressed as the rate at which a film can be extruded before water is carried along with the film. The higher the water carry-over value, the faster and more economically a resin film can be processed.

In this invention, small amounts of fluoborate salts such as sodium fluoborate, potassium fluoborate, and ammonium fluoborate, when used as additives to polypropylene compositions, neutralize acidic catalyst residues as efficiently as some of the commonly used acid scavenger additives (as measured by the corrosion rating) while providing the additional benefit of better (higher) water carry-over values and lower yellowness index values. This effect is seen specifically in an additive package containing hindered amine light stabilizers. These fluoborates show definite improvement over typical acid scavengers alone such as synthetic dihydroxy talcite (DHT-4A, Kyowa Chemical), magnesium/aluminum hydroxycarbonate (L55R, Reheis Chemical) and calcium stearate.

SUMMARY OF THE INVENTION

A polypropylene composition which demonstrates good color and water carry-over properties comprises polypropylene containing a hindered amine light stabilizer and about 0.01 to about 0.5 wt.% of a fluoborate salt. The fluoborate salts used in this invention typically are a part of a total additive package which may contain antioxidants and other special purpose materials stated above.

DETAILED DESCRIPTION OF THE INVENTION

Compositions of this invention comprise polypropylene containing small, but effective, amounts of an ammonium or metal fluoborate salt in the presence of a hindered amine light stabilizer. The fluoborate salt is represented by the formula:

$$Me(BF_4)_n$$

wherein Me is ammonium or a Group IA or IIA metal and n is the valence of Me. Examples of such fluoborate salts include ammonium fluoborate, sodium fluoborate, potassium fluoborate, calcium fluoborate, magnesium fluoborate and mixtures thereof. Of these, ammonium fluoborate, sodium fluoborate and potassium fluoborate are preferred for use in this invention.

In the compositions of this invention, the fluoborate salt is included at low levels, typically in the range of about 0.01 to about 0.5 wt.% and preferably about 0.02 to about 0.1 wt.%. The hindered amine light stabilizer is included at concentrations typically in the range of about 0.01 to about 1.0 wt.% and preferably about 0.02 to about 0.5 wt.%.

As used herein, polypropylene is a solid polymer of propylene which may contain up to about 30 wt.% of other α-olefin monomers such as ethylene and butene-1.

As used herein, hindered amine light stabilizer (HALS) means any of a family of tetramethylpiperidiene (TMP) compounds containing a hindered amine functionality used as UV light stabilizers for polyolefins and referred to collectively as HALS, even though these may contain other moieties such as hindered phenol or phosphite groups. See, Yang et al., *Polymer Degradation and Stability*, 20:1-35 (1988), and "Light Stabilizers for Polyolefins, " Ciba-Geigy Limited, Basel, Switzerland, incorporated herein by reference.

The invention described herein is illustrated, but not limited, by the following examples.

EXAMPLE I

A series of polypropylene formulations was prepared by melt blending a portion of polypropylene homopolymer having a melt flow rate of 1.4, number average molecular weight of 60,000, and weight average molecular weight of 430,000, with 0.05 wt.% octadecyl 3,5,di-t-butyl-4-hydroxyhydrocinnamate sold under the trademark Irganox 1076 by Ciba-Geigy, 0.03 wt.% tris(3,5-di-t-butyl-4-hydroxybenzyl)isocyanurate sold under the trademark Irganox 3114 by Ciba-Geigy, 0.05 wt.% tris(2,4-di-t-butylphenyl) phosphite sold under the trademark Irgafos 168 by Ciba-Geigy, 0.05 wt.% N-N'bis(2,2,6,6- tetramethyl-4-piperidinyl)-1,6-hexanediamine, polymer with 2,4,6-trichloro-1,3,5-triazine and 2,4,4-trimethyl-1,2pentanamine sold under the trademark Chimassorb 944FL by Ciba-Geigy and 0.02 wt.% acid scavenger. Corrosivity ratings, yellowness index values and water carry-over results are given below:

| Example | Acid Scavenger | Severe Corrosivity Rating | Yellowness Index | Water Carry-over ft/min |
|---|---|---|---|---|
| I-1 | L55R | 0.0 | 6.0 | 94 |
| I-2 | DHT-4A | 0.0 | 6.0 | 100 |
| I-3 | Zinc Stearate | 0.0 | 3.0 | <25 |
| I-4 | Calcium Stearate | 0.8 | 7.4 | 55 |
| I-5 | Sodium Fluoborate | 1.0 | 4.0 | 108 |
| I-6 | Potassium Fluoborate | 1.0 | 3.9 | 112 |
| I-7 | Ammonium Fluoborate | 1.0 | 3.4 | 113 |

In this example, sodium fluoborate, potassium fluoborate, and ammonium fluoborate gave corrosivity ratings comparable to that for calcium stearate, yellowness index values lower than those obtained with magnesium/aluminum hydroxycarbonate (L55R), dihydroxy talcite (DHT-4A) and calcium stearate, and water carry-over values greater than the other four commonly used acid scavengers shown above.

EXAMPLE II

In this example, a series of polypropylene formulations was prepared by melt blending a portion of polypropylene homopolymer having a melt flow rate of 2.4, number average molecular weight of 60,000, and weight average molecular weight of 400,000, with 0.01 wt.% butylated hydroxytoluene (BHT), 0.02 wt.% acid scavenger, and 0.05 wt.% additional additive. Corrosivity, yellowness index, and water carryover results were as follows:

| Example | Acid Scavenger | Additional Additive | Severe Corrosivity Rating | Yellowness Index | Water Carry-over ft/min |
|---|---|---|---|---|---|
| II-1 | DHT-4A | Irganox 1076 | 0.5 | 5.9 | 135 |
| II-2 | Ca St | " | 1.5 | 5.7 | 118 |
| II-3 | KBF4 | " | 1.5 | 10.2 | 130 |
| II-4 | DHT-4A | Irganox 3114 | 0.5 | 6.2 | 129 |
| II-5 | Ca st | " | 1.5 | 4.3 | 100 |
| II-6 | KBF4 | " | 1.5 | 9.6 | 123 |
| II-7 | DHT-4A | Irgafos 168 | 0.5 | 5.1 | 141 |
| II-8 | Ca st | " | 1.8 | 3.8 | 117 |
| II-9 | KBF4 | " | 2.0 | 8.0 | 138 |
| II-10 | DHT-4A | Chimassorb 944 FL | 0.5 | 6.5 | 139 |
| II-11 | Ca St | " | 1.0 | 6.5 | 104 |

-continued

| Example | Acid Scavenger | Additional Additive | Severe Corrosivity Rating | Yellowness Index | Water Carry-over ft/min |
| --- | --- | --- | --- | --- | --- |
| II-12 | KBF4 | " | 1.3 | 3.3 | 135 |

In this example, the potassium fluoborate was ball-milled as a 50:50 blend with polypropylene powder to assure the best possible dry blend mixing prior to melt blending with the other ingredients indicated above. As in Example I, the resin corrosivity ratings with potassium fluoborate were comparable to those obtained with calcium stearate. Potassium fluoborate was effective in controlling color only when a hindered amine light stabilizer (Chimassorb 944FL) was included in the resin formulation. The combination of low yellowness index and high water carry-over was observed only for that formulation containing both a fluoborate and a hindered amine light stabilizer.

EXAMPLE III

A series of polypropylene formulations was prepared by melt blending a portion of polypropylene homopolymer having a melt flow rate of 1.3, number average molecular weight of 60,000, and weight average molecular weight of 430,000, with 0.05 wt.% Irganox 1076, 0.04 wt.% Irganox 3114, 0.05 wt% Irgafos 168, 0.05 wt.% hindered amine light stabilizer (HALS), and 0.04 wt.% acid scavenger. Yellowness index values and water carry-over results are given below:

| Example | HALS | Acid Scavenger | Yellowness Index | Water Carry-over ft/min |
| --- | --- | --- | --- | --- |
| III-1 | Chimassorb 944 | DHT | 4.4 | 98 |
| III-2 | " | Calcium Stearate | 6.6 | <25 |
| III-3 | " | Potassium Fluoborate | −0.05 | 110 |
| III-4 | " | Sodium Fluoborate | 1.2 | 95 |
| III-5 | " | Ammonium Fluoborate | −0.3 | 104 |
| III-6 | Cyassorb UV3346 | DHT | 1.2 | <25 |
| III-7 | " | Calcium Stearate | 1.5 | <25 |
| III-8 | " | Potassium Fluoborate | −0.9 | <25 |
| III-9 | " | Sodium Fluoborate | 0.1 | <25 |
| III-10 | " | Ammonium Fluoborate | 0.3 | 94 |
| III-11 | Tinuvin 770 | DHT | 1.1 | 71 |
| III-12 | " | Calcium Stearate | 1.3 | <25 |
| III-13 | " | Potassium Fluoborate | −1.0 | 73 |
| III-14 | " | Sodium Fluoborate | −1.1 | 72 |
| III-15 | " | Ammonium Fluoborate | −0.2 | 72 |

In this example, sodium fluoborate, potassium fluoborate and ammonium fluoborate gave yellowness index values lower than those obtained with DHT or calcium stearate and water carry-over values equal to or greater than those for the two commonly used acid scavengers shown above. The preferred fluoborate is dependent upon the particular HALS included in the formulation and the balance of yellowness index—water carry-over desired.

That which claimed is:

1. A polypropylene composition having improved color and water carry-over properties comprising about 0.01 to about 1.0 wt.% of a hindered amine light stabilizer and about 0.01 to about 0.5 wt.% of a fluoborate salt.

2. The composition of claim 1 containing about 0.02 to about 0.1 wt.% of a fluoborate salt.

3. The composition of claim 1 containing about 0.02 to about 0.5 wt.% hindered amine light stabilizer.

4. The composition of claim 1 wherein the fluoborate salt is selected from the group consisting of Group IA or IIA metal salts or an ammonium salt and mixtures thereof.

5. The composition of claim 1 wherein the fluoborate salt is ammonium fluoborate, potassium fluoborate or sodium fluoborate.

6. The composition of claim 1 wherein the fluoborate salt is potassium fluoborate.

7. A film formed from a polypropylene composition having improved color and water carry-over properties comprising about 0.01 to about 1.0 wt.% of a hindered amine light stabilizer and about 0.01 to about 0.5 wt.% of a fluoborate salt.

8. The film of claim 7 wherein the fluoborate salt is present at a concentration of about 0.02 to about 0.1 wt.%.

9. The film of claim 7 wherein the fluoborate salt is a Group IA or IIA metal salt or ammonium salt or mixture thereof.

10. The film of claim 7 wherein the fluoborate salt is potassium fluoborate.

11. The film of claim 7 wherein the fluoborate salt is sodium fluoborate or ammonium fluoborate.

12. In a polypropylene composition containing a hindered amine light stabilizer, the improvement wherein the polypropylene composition comprises about 0.01 to about 0.5 wt.% of a fluoborate salt and wherein the polypropylene has improved color and water carry-over properties.

* * * * *